US010748343B2

United States Patent
Menard et al.

(10) Patent No.: US 10,748,343 B2
(45) Date of Patent: Aug. 18, 2020

(54) MODIFIABLE SIMULATION OF PHYSICAL OBJECT BEHAVIOR

(71) Applicant: Microsoft Technology Licensing, LLC, Redmond, WA (US)

(72) Inventors: Anthony Robert Menard, Seattle, WA (US); Donna Katherine Long, Redmond, WA (US); James Michael Ratliff, Seattle, WA (US); Aaron Daniel Krauss, Snoqualmie, WA (US); Evan L. Jones, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 11 days.

(21) Appl. No.: 16/036,825

(22) Filed: Jul. 16, 2018

(65) Prior Publication Data
US 2020/0020166 A1    Jan. 16, 2020

(51) Int. Cl.
*G06T 19/00*    (2011.01)
*G06F 30/20*    (2020.01)
*A63F 13/57*    (2014.01)

(52) U.S. Cl.
CPC ............ *G06T 19/006* (2013.01); *G06F 30/20* (2020.01); *A63F 13/57* (2014.09)

(58) Field of Classification Search
None
See application file for complete search history.

(56) References Cited

U.S. PATENT DOCUMENTS

| 8,913,058 | B2 | 12/2014 | Liu |
| 9,691,183 | B2 | 6/2017 | Trainor |
| 9,751,212 | B1* | 9/2017 | Martinson .............. G06N 3/008 |
| 9,914,037 | B2* | 3/2018 | Nordstrom ............. A63B 69/36 |
| 2005/0233815 | A1* | 10/2005 | McCreary .......... A63B 24/0021 |
| | | | 473/131 |

(Continued)

FOREIGN PATENT DOCUMENTS

CN      107622524 A    1/2018

OTHER PUBLICATIONS

"Creator AVR—EON Reality", Retrieved from: https://www.eonreality.com/platform/creator-avr/, Retrieved on: May 23, 2018, 9 Pages.
"Using augmented reality to enhance ecosystem science field trips", Retrieved from: http://ecoleam.gse.harvard.edu/ecoMOBILE/design.php, Retrieved on: May 23, 2018, 2 Pages.

(Continued)

*Primary Examiner* — Jwalant Amin
(74) *Attorney, Agent, or Firm* — Alleman Hall Creaseman & Tuttle LLP

(57) ABSTRACT

A computer device is provided that includes an input device, a sensor device, a display device, and a processor. The processor is configured to detect a physical object in a physical environment based on sensor data received via the sensor device, measure one or more physical parameters of the physical object based on the sensor data, determine a physical behavior of the physical object based on the measured one or more physical parameters, present a graphical representation of the physical behavior of the physical object via the display device, generate a simulation of the physical behavior of the physical object based on the measured one or more physical parameters, receive a user input to modify the one or more physical parameters for the simulation via the input device, and present the simulation with the modified one or more physical parameters via the display device.

20 Claims, 11 Drawing Sheets

(56) References Cited

U.S. PATENT DOCUMENTS

| | | |
|---|---|---|
| 2012/0320088 A1 | 12/2012 | Ihara et al. |
| 2013/0328762 A1 | 12/2013 | McCulloch et al. |
| 2016/0031681 A1* | 2/2016 | Delplace ................ B66C 15/06 345/420 |
| 2016/0071320 A1 | 3/2016 | Smith |
| 2017/0220887 A1* | 8/2017 | Fathi ................ G06K 9/00201 |
| 2019/0134487 A1* | 5/2019 | Kudirka ................ A63F 13/00 |

OTHER PUBLICATIONS

Bower, et al., "Augmented Reality in education—cases, places and potentials", In Journal of Educational Media International, vol. 51, Issue 1, Mar. 4, 2014, pp. 1-15.

Brown, Peter, "Augmented Reality: Beyond Gaming to Real-World Solutions", Retrieved from: https://www.mouser.com/applications/augmented-reality-beyond-gaming/, Retrieved on: May 23, 2018, 4 Pages.

Kaufmann, Hannes, "Virtual Environments for Mathematics and Geometry Education", In Journal of Themes in Science and Technology Education, vol. 2, No. 1-2, Jan. 18, 2011, pp. 131-152.

Mason, Will, "This Mixed Reality Educational App Gives You X-Ray Goggles and Takes You Into the Human Body", Retrieved from: https://uploadvr.com/curioscope-mixed-reality-educational-kickstarted, Feb. 12, 2016, 5 Pages.

Tolentino, et al., "Teaching and Learning in the Mixed-Reality Science Classroom", In Journal of Science Education and Technology, vol. 18, Issue 6, Dec. 2009, pp. 501-517.

"International Search Report and Written Opinion Issued in PCT Application No. PCT/US2019/037588", dated Oct. 7, 2019, 11 Pages.

* cited by examiner

MODIFIABLE SIMULATION OF PHYSICAL OBJECT BEHAVIOR

BACKGROUND

Current education systems utilize textbooks and two dimensional visuals on screens to convey information about the world. However, these systems are inherently separate from the real-world and are constrained to the static scenarios of the textbooks. As a result, it may be difficult for students learning using those textbook scenarios to apply that knowledge to the real-world.

SUMMARY

A computer device is provided that may include an input device, a sensor device, a display device, and a processor. The processor may be configured to detect a physical object in a physical environment based on sensor data received via the sensor device, measure one or more physical parameters of the physical object based on the sensor data, determine a physical behavior of the physical object based on the measured one or more physical parameters, present a graphical representation of the physical behavior of the physical object via the display device, generate a simulation of the physical behavior of the physical object based on the measured one or more physical parameters, receive a user input to modify the one or more physical parameters for the simulation via the input device, and present the simulation with the modified one or more physical parameters via the display device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
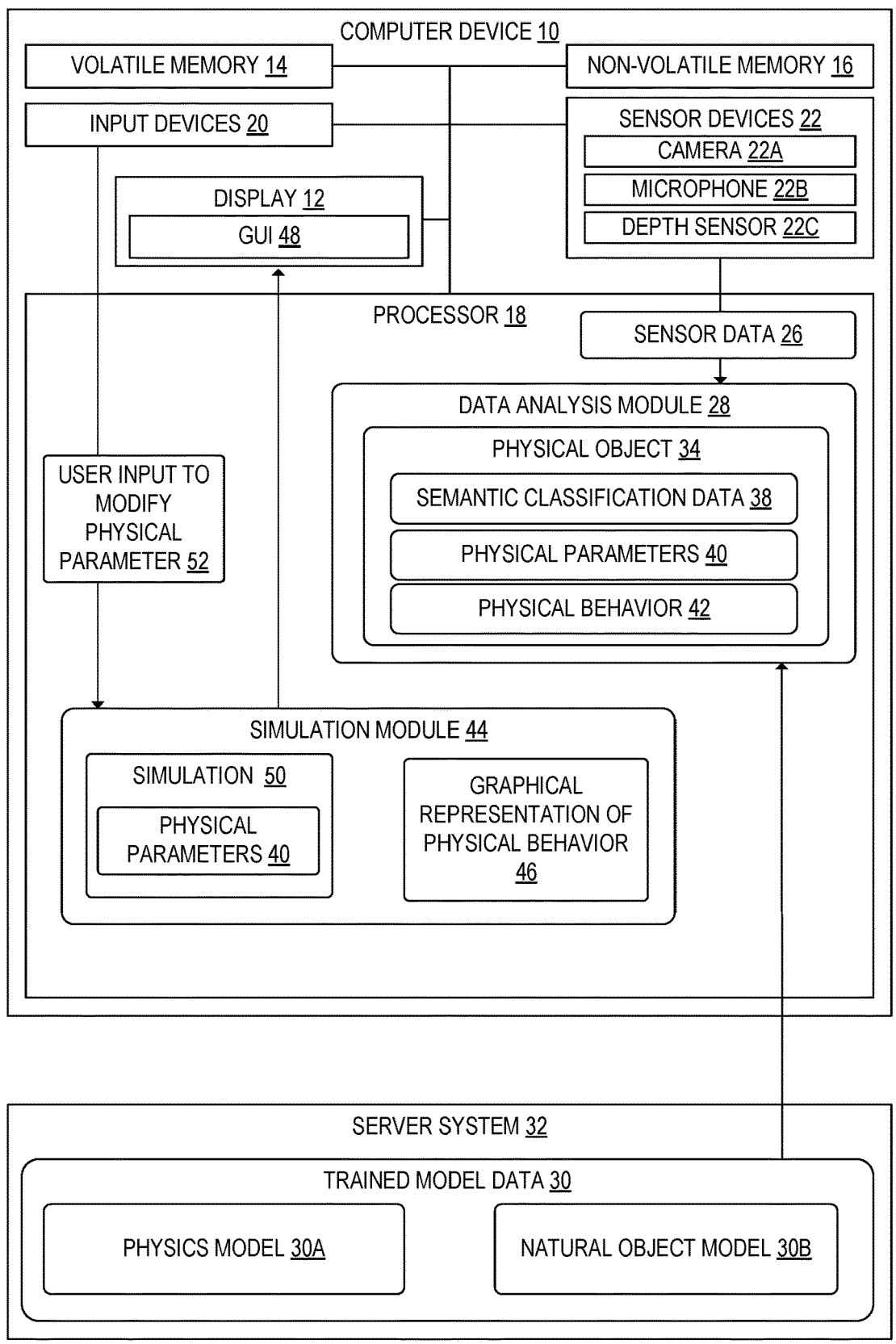
FIG. 1 shows an example computer device implementing an integrated development environment according to one embodiment of the present disclosure.

In order to address the challenges discussed above, a computer device 10 is provided, as shown in the example embodiment of FIG. 1. The computer device 10 may include a display 12, volatile memory 14, non-volatile memory 16, a processor 18, input devices 20, and sensor devices 22. The input devices 20 may include one or more input devices, such as, for example, a keyboard, a mouse, a trackpad, a touchscreen, a microphone, a camera, and/or some other input device 20. In addition to the display 12, the computer device 10 may further include one or more other output devices, such as a speaker, a haptic feedback unit, or another type of output device. The sensor devices 22 may include one or more sensor devices, such as, for example, a camera 22A such as an RGB camera, a microphone 22B or another type of sound sensor, a depth sensor 22C such as a depth camera, and other types of sensor devices such as an inertial motion unit, a global positioning system (GPS) unit, etc.

Figure 2:
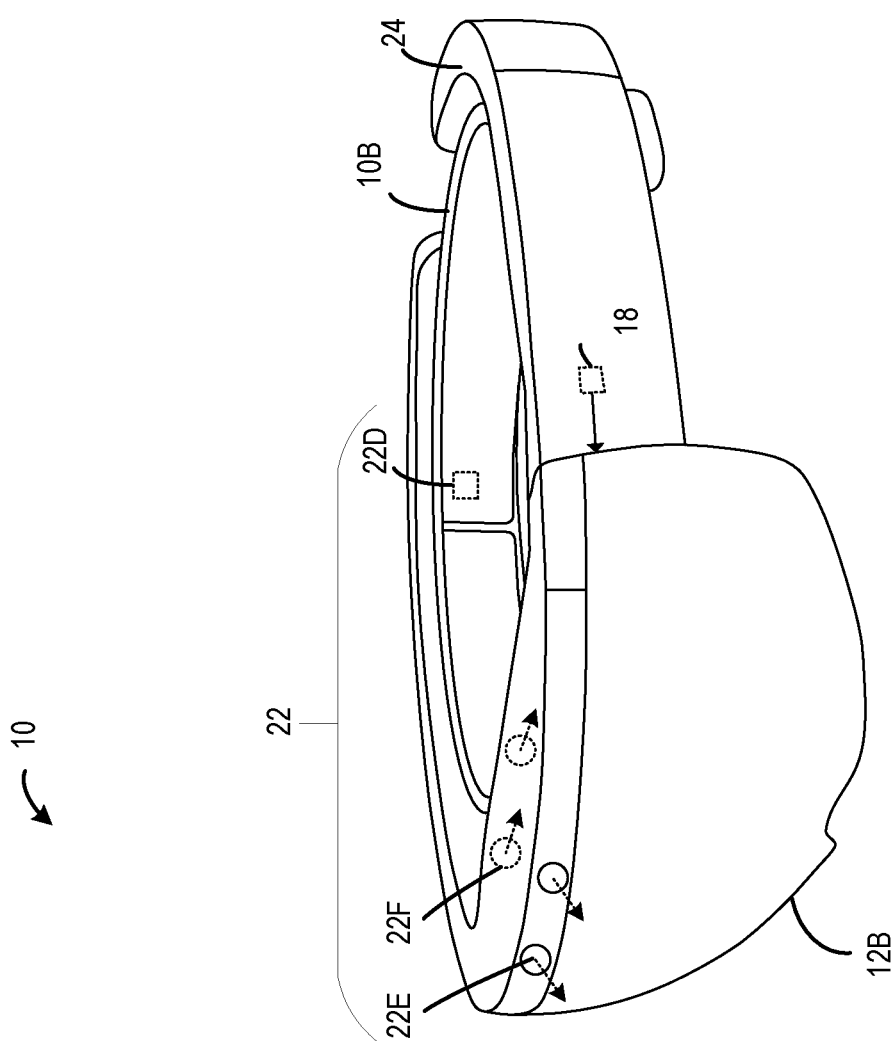
FIG. 2 shows a schematic view of a head mounted display device and a mobile computer device embodiment of the computer device of FIG. 1.
Figure 2:
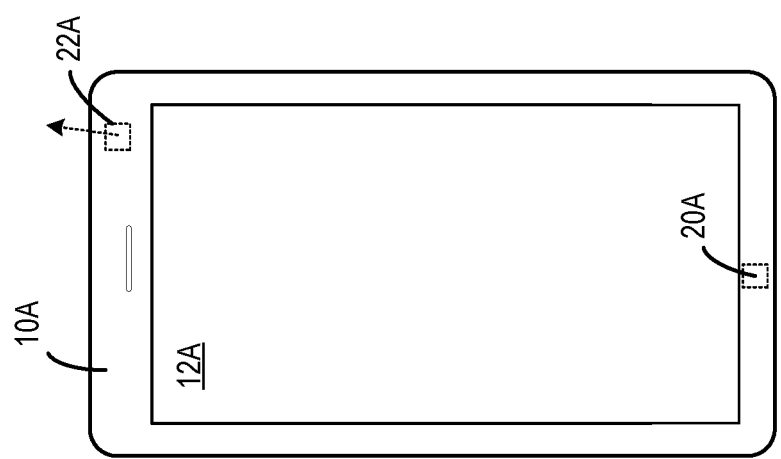

The computer device 10 may take the form of a head mounted display (HMD) device, a mobile computer device such as a smartphone, a laptop computer device, a tablet computer device, or another suitable type of computer device. FIG. 2 illustrates two example forms of the computer device 10. In one example illustrated in FIG. 2, the computer device 10 takes the form of a mobile computer device 10A, which, for example, may be a smartphone or tablet computer device. The mobile computer device 10A may include a capacitive touch screen 12A, which includes both the display 12 and a capacitive touch sensor input device of the one or more inputs devices 20. The mobile computer device 10A may include other types of input devices 20, such as a microphone input device 20A. As illustrated, the mobile computer device 10A may also include a camera 22A sensor device. It should be appreciated that the mobile computer device 10A may further include each computer component of computer device 10 described herein.

In another example illustrated in FIG. 2, the computer device 10 takes the form of an HMD device 10B, which may be worn by a user according to an example of the present disclosure. The HMD device 10B includes a near-eye display device 12B. The near-eye display device 12B may take the form of an at least partially see-through display that is supported in front of a viewer's eye or eyes in an augmented reality HMD device configuration. In another example, the near-eye display device 12B may take the form of a non-see-through display in a virtual reality HMD device configuration.

In the example of FIG. 2, the HMD device 10B includes a frame 24 that wraps around the head of a user to position the near-eye display device 12B close to the user's eyes. The frame 24 supports additional components of the HMD device 10B, such as, for example, the volatile memory 14, the non-volatile memory 16, the processor 18, input devices 20, sensor devices 22, and other computer components of the computer device 10 described herein. The processor 18 includes logic and associated computer memory configured to provide image signals to the near-eye display device 12B, to receive sensor data from sensor devices 22, and to enact various control processes described herein.

Any suitable display technology and configuration may be used to display images via the near-eye display device 12B. For example, in a non-augmented reality configuration, the near-eye display device 12B may be a non-see-through Light-Emitting Diode (LED) display, a Liquid Crystal Display (LCD), or any other suitable type of non-see-through display. In an augmented reality configuration, the near-eye display device 12B may be configured to enable a wearer of the HMD device 10 to view a physical, real-world object in the physical environment through one or more partially transparent pixels displaying virtual object representations. For example, the near-eye display device 12B may include image-producing elements such as, for example, a see-through Organic Light-Emitting Diode (OLED) display.

As another example, the HMD device 10B may include a light modulator on an edge of the near-eye display device 12B. In this example, the near-eye display device 12B may serve as a light guide for delivering light from the light modulator to the eyes of a wearer. In other examples, the near-eye display device 12B may utilize a liquid crystal on silicon (LCOS) display.

The sensor devices 22 may include various sensors and related systems to provide information to the processor 18. Such sensors may include, but are not limited to, an inertial measurement unit (IMU) 22D, one or more outward facing cameras 22E, and one or more inward facing cameras 22F. The one or more inward facing cameras 22F may be configured to acquire image data in the form of gaze tracking data from a wearer's eyes.

The processor 18 may execute instructions to determine gaze directions of each of a wearer's eyes in any suitable manner based on the information received from the inward facing cameras 22F. For example, one or more light sources, such as infrared light sources, may be configured to cause a glint of light to reflect from the cornea of each eye of a wearer. The one or more inward facing cameras 22F may be configured to capture an image of the wearer's eyes. Images of the glints and of the pupils as determined from image data gathered from the image sensors may be used to determine an optical axis of each eye. Using this information, the processor 18 may execute instructions to determine a direction in which the wearer is gazing.

In other implementations, a different type of gaze sensor may be employed in the HMD device 10B to measure one or more gaze parameters of the user's eyes. Examples of gaze parameters measured by one or more gaze sensors may include an eye gaze direction or gaze vector, head orientation, eye gaze velocity, eye gaze acceleration, change in angle of eye gaze direction, and/or any other suitable tracking information.

The one or more outward facing cameras 22E may be configured to capture and/or measure physical environment attributes of the physical environment in which the HMD device 10B is located. In one example, outward facing cameras 22E may include a visible-light camera configured to collect a visible-light image of a physical space. Further, the one or more outward facing cameras 22E may include a depth sensor 22C such as a depth camera configured to collect a depth image of a physical space. More particularly, in one example the depth camera is an infrared time-of-flight depth camera. In another example, the depth camera is an infrared structured light depth camera.

Data from the outward facing camera 22E may be used by the processor 18 to generate and/or update a three-dimensional (3D) model of the physical space. Data from the outward facing camera 22E may be used by the processor 18 to identify surfaces of the physical space and/or measure one or more surface parameters of the physical space. The processor 18 may execute instructions to generate/update virtual scenes displayed on near-eye display device 12B and identify surfaces of the physical space in any suitable manner. In one example, depth maps derived from depth data provided by the depth camera of camera 22E may be used to accurately position and determined occlusion for virtual text displayed on the near-eye display device 12B. In virtual reality configurations of the HMD device 10B, image data captured by the outward facing cameras 22E may be passed through and displayed on the near-eye display 12B, with additional visual content superimposed on the passed through image data by the processor 18.

In augmented reality configurations of HMD device 10B, the position and/or orientation of the HMD device 10B relative to the physical environment may be assessed so that augmented-reality images may be accurately displayed in desired real-world locations with desired orientations. As noted above, the processor 18 may execute instructions to generate a 3D model of the physical environment including surface reconstruction information and simultaneous localization and mapping (SLAM) that may be used to identify surfaces in the physical space to localize the HMD device 10B and holograms and/or images displayed on the near-eye display 12B.

In both augmented reality and non-augmented reality configurations of HMD device 10B, the IMU 22D of HMD device 10B may be configured to provide position and/or orientation data of the HMD device 10B to the processor 18. In one implementation, the IMU 22D may be configured as a three-axis or three-degree of freedom (3DOF) position sensor system. This example position sensor system may, for example, include three gyroscopes to indicate or measure a change in orientation of the HMD device 10B within 3D space about three orthogonal axes (e.g., roll, pitch, and yaw). The orientation derived from the sensor signals of the IMU may be used to display, via the near-eye display device 12B, one or more holographic images with a realistic and stable position and orientation.

In another example, the IMU 22D may be configured as a six-axis or six-degree of freedom (6DOF) position sensor system. Such a configuration may include three accelerometers and three gyroscopes to indicate or measure a change in location of the HMD device 10B along three orthogonal spatial axes (e.g., x, y, and z) and a change in device orientation about three orthogonal rotation axes (e.g., yaw, pitch, and roll). In some implementations, position and orientation data from the outward facing camera 22E and the IMU 22D may be used in conjunction to determine a position and orientation (or 6DOF pose) of the HMD device 10B.

In some examples, a 6DOF position sensor system may be used to display holographic representations in a world-locked manner. A world-locked holographic representation appears to be fixed relative to one or more real world objects viewable through the HMD device 10B, thereby enabling a wearer of the HMD device 10B to move around a real world physical environment while perceiving a world-locked hologram as remaining stationary in a fixed location and orientation relative to the one or more real world objects in the physical environment.

Turning back to FIG. 1, the sensor devices 22 of the computer device 10 are configured to capture a stream of sensor data 26 that may be processed by a data analysis module 28 executed by the processor 18. The data analysis module 28 may be configured to process the sensor data 26 using trained model data 30 that may be retrieved from a server system 32 and/or memory of the computer device 10. For example, the computer device 10 may be configured to communicate with the server system 32 via a network, such as a wide area network, or another suitable type of network. The trained model data 30 may include one or more different types of trained models such as a physical model 30A, a natural object model 30B, etc. As a few other non-limiting examples, the trained model data 30 may include a chemistry model, a dynamic physics model, a static physics model, a geology model, a meteorology model, etc. Each of the trained models 30 may be downloaded separately by a user of the computer device 10 to selectively choose a learning focus for the computer device 10.

The trained model data 30 may include an object recognition component. As one example of such an object recognition component, the trained object model may include a convolutional neural network trained on an image data set in which images have been semantically tagged by users with words (typically nouns) that represent the objects in the image. One example dataset that may be used for the object model is IMAGENET. As a specific example, the object recognition component may be trained to recognize physical three-dimensional models using two-dimensional image classification techniques. For example, using a database of three-dimensional models, the trained model data 30 may include a plurality of two-dimensional training images of each of the three-dimensional models at various angles, lighting conditions, realistic background, different colors, different materials, etc. Images taken by the camera sensors of the computer device may then be compared to these two-dimensional training images of the trained model data 30 to recognize the physical object.

Using the trained model data 30, the data analysis module 28 executed by the processor 18 is configured to detect a physical object 34 in a physical environment 36 based on sensor data 26 received via the sensor devices 22. For example, a camera 22A sensor device and a depth sensor device 22C may capture images of the physical environment 36. The images of the physical environment 36 may be sent to the data analysis module 28 in a stream of sensor data 26. The data analysis module 28 may be configured to process the captured images of the physical environment 36 to perform surface reconstruction, edge detection, centroid detection, object recognition, and other machine vision processing methods to detect one or more physical objects 34. The types of physical objects 34 detected by the data analysis module 28 may include structures, movable objects, natural objects, and other types of objects. As a few non-limiting examples, structure objects may include buildings, bridges, and other structures mounted immovably to the physical environment 36. The movable objects may include man-made objects that are movable, such as a rock, a ball, a car, etc. Natural objects may include animals, birds, plants, people, rocks, mountains, clouds, etc. It should be appreciated that the examples of structures, movable objects, and natural objects described above are merely exemplary, and that the data analysis module 28 may be configured to detect other types of objects based on the trained module data 30.

After detecting the physical object 34, the data analysis module 28 may be further configured to identify the physical object 34 by processing the sensor data 26 using trained model data 30. The trained model data 30 may also include semantic classification data 38 for the types of physical objects 34 included in the trained model data 30. Based on the sensor data 26, the data analysis module 28 may the retrieve semantic classification data 38 associated with the physical object 34, and tag the identified physical object 34 with the semantic classification data 38. For example, using trained model data 30 of a natural object model 30B, the data analysis module 28 may be configured to detect a flying object in the images captured by the sensor devices 22, and further identify that the flying object is an eagle based on features such as beak shape, wing shape, size, etc., used to train the natural object model 30B. Thus, the physical object 34 may be tagged with semantic classification data 38 of an eagle. It should be appreciated that identifiable physical objects 34 are not limited to animals, but may further include building and bridge classifications such as a specific historical building or bridge, a specific architectural design, etc. As another example, identifiable physical objects 34 may further include geology classifications, such as a type or composition of rocks and minerals.

As illustrated in FIG. 1, the data analysis module 28 is further configured to measure one or more physical parameters 40 of the physical object 34 based on the sensor data 26. For example, the data analysis module 28 may be configured to measure a velocity, position, heading, mass, and volume of the physical object 34. It should be appreciated that the physical parameters 40 being measured may be based on the type of physical object 34 identified by the data analysis module 28. That is, the velocity, position, heading, mass, volume, drag, trajectory, and other physical parameters that affect movement through the physical environment may be measured for physical objects that are identified as movable objects. As another example, physical objects that are identified as structure objects may have measured physical parameters 40 that include physical parameters such as, for example, mass, volume, shear force, friction, and load on the structure object. As another example, the one or more physical parameters 40 may include parameters of the physical environment 36 that affect the physical object 34, such as, for example, gravitational force, wind speed, humidity, elevation, etc.

These physical parameters 40 may be measured based on sensor data 26 received from a plurality of different sensor devices 22. For example, velocity, position, heading, and volume parameters may be calculated based on a series of images captured by camera sensor devices 22A and depth sensor devices 22C. Other physical parameters 40 may have known values based on a location of the computer device 10 detected via a GPS sensor device, such as, for example, gravitational force, elevation, location, etc. Values for physical parameters of the physical environment 36 that are not static may be gathered by the sensor devices 22 and/or retrieved from sensor data stored on the server system 32, such as, for example, weather data including wind speed, humidity, etc.

Other physical parameters 40 such as mass, load, friction, drag, etc., may be estimated by the data analysis module 28 based on known values for physical objects 34 that have been identified as described above. For example, the data analysis module 28 may be configured to calculate the load placed on a bridge by detecting each car on the bridge via image analysis of images captured by the camera sensor devices 22A, identifying the cars and retrieving semantic classification data for the identified cars such as a specific type of car, or a broad classification of vehicles such as truck, sedan, SUV, train, etc. The data analysis module 28 may estimate the weight of the identified vehicle physical objects based on a known average weight of vehicles for that semantic classification of vehicle. By estimating the total weight of each vehicle on a bridge in this manner, the data analysis module 28 may estimate a total load being placed on the bridge by the vehicles.

It should be appreciated that the examples of physical parameters 40 and processes for measuring those physical parameters based on sensor data 26 described above are merely exemplary, and that other types of physical parameters 40 may be measured based on other types of sensor data 26 not specifically described above.

After measuring one or more physical parameters 40 for the detected physical object 34, the data analysis module 28 may be configured to determine a physical behavior 42 of the physical object 34 based on the measured one or more physical parameters 40. Example types of physical behaviors 42 may include a path of travel of a movable object. That is, based on measured physical parameters 40 of a movable physical object such as an initial velocity, trajectory, gravitational force, wind speed, drag, etc., the data analysis module 28 may determine a path of travel for the movable object that predicts how the movable object will move through the physical environment 36. The data analysis module 28 may be configured to determine a mathematic expression that best fits the physical behavior 42 of the detected physical object 34 using symbolic regression techniques. For example, the data analysis module 28 may search a space of mathematical expressions defined in the trained model data 30 to find the mathematical expression that best fits the measured one or more physical parameters 40 to describe the physical behavior 42 of the physical object 34.

As another example, the physical behaviors 42 may include deformation and/or shear of the physical object 34 that may be determined based on a material composition of the physical object 34 and an estimated load physical parameter being placed on the physical object 34. As another example, the physical behaviors 42 may include an oscillation of a pendulum physical object that may be determined based on a length and an amplitude physical parameter measured for the pendulum physical object. It should be appreciated that the example physical behaviors 42 described above are merely exemplary, and that other types of physical behaviors 42 may be determined based on any suitable type of measurable physical parameters 40. In one example, the physical behaviors 42 may be determined and modeled by the processor 18 using a physics engine that is configured to simulate rigid body mechanics, fluid dynamics, etc. As a specific example, the processor 18 may use the one or more measured physical parameters 40 as input to a HAVOK physics engine that may model the physical behaviors 42 of the physical object 34, and output a result of the physics simulation to the data analysis module 28.

As illustrated in FIG. 1, a simulation module 44 executed by the processor 18 is configured to generate a graphical representation 46 of the determined physical behavior 42 of the physical object 34. In one example, the graphical representation 46 may include mathematical functions that describe the physical behavior 42 as well as the physical parameters 40 that affect those mathematical functions. The graphical representation 46 may be generated for a visual format suitable for the type of display 12 of the computer device. For a mobile computer device 10A that includes a two-dimensional display, the graphical representation 46 may be rendered to a two-dimensional viewport. In one example, the graphical representation 46 may be rendered to be superimposed on images of the physical environment 36 captured by the camera sensor devices 22A. In this example, the processor 18 may be configured to present the graphical representation 46 of the physical behavior 42 of the physical object 34 superimposed on the physical environment 36 via the display 12 of the computer device 10. In one example, the graphical representation 46 is rendered in a graphical user interface 48 layer that is rendered on top of images of the physical environment 36 captured by the camera sensor devices 22A. In another example, the graphical representation 46 may be generated as a virtual object having a location in the physical environment 36 and rendered to the two dimensional viewport of the display 12 based on its virtual depth and location in the physical environment 36.

Similarly, in a virtual reality HMD device 10B example that includes a non-see-through near-eye display device 12B, the graphical representation 46 may similarly be rendered to be superimposed on images of the physical environment 36 captured by the outward facing cameras 22E. Further, the graphical representation 46 may be generated as a virtual object having a location in the 3D mapping of the physical environment 36 and rendered from the user's current perspective determined based on the sensor devices 22 including the user's detected gaze direction, pose, location, and position relative to surfaces identified in the physical environment 36.

In an augmented reality HMD device 10B example that includes an at least partially see-through display 12B, the graphical representation 46 may be generated as a virtual three-dimensional hologram having a location in the 3D mapping of the physical environment 36 and rendered from the user's current perspective determined based on the sensor devices 22 including the user's detected gaze direction, pose, location, and position relative to surfaces identified in the physical environment 36. The graphical representation 46 is rendered as a three-dimensional hologram that is projected onto the user's eye, such that the graphical representation appears to be positioned at the world-locked location and depth in the physical environment while the user is viewing the physical environment 36 through the at-least partially see-through display 12B.

The simulation module 44 executed by the processor 18 is further configured to generate a simulation 50 of the physical behavior 42 of the physical object 34 based on the measured one or more physical parameters 40 and the sensor data 26. For example, based on the images captured by the camera sensor device 22A, the simulation module 44 may generate a virtual object or hologram with the appearance of the physical object 34. The simulation 50 may render the virtual object or hologram of the physical object 34 to follow the determined physical behavior 42, such as, for example, a virtual ball following a determined path of travel. The simulation 50 may simulate all of the physical parameters 40 that were measured for the physical object 34 and the surrounding physical environment 36 to accurately simulate the physical behavior 42 of the physical object 34 in real-time. For example, the simulation 50 may simulate the path of travel of a ball that has been thrown based on the measured velocity, trajectory, gravitational forces, wind speed, drag, and other physical parameters 40 measured for the physical object 34 and physical environment 36. The simulation 50 may be presented to the user via the display 12 superimposed on the physical environment 36.

After the simulation 50 has been generated, the user may enter user input to the input devices 20 to modify the one or more physical parameters 40 for the simulation 50. For example, the user may enter input via the GUI 48 displayed to the user to change one or more of the physical parameters 40 measured for the physical object 34 and the physical environment 36. As a specific example, the user may modify a velocity of a thrown object, and/or a gravitational force of the physical environment 36 to learn how those physical parameters 40 affect the path of travel physical behavior 42 of the thrown ball physical object 34.

After receiving the use input to modify the one or more physical parameters 52, the simulation module 44 determines a modified physical behavior 42 based on the modifications to the one or more physical parameters 52. For example, the simulation module 44 may determine an updated path of travel for a thrown ball physical object 34 based on receiving a user input to modify a gravitational force physical parameter 40. After modifying the simulation 50, the processor 18 may be configured to present the simulation 50 with the modified one or more physical parameters 40 via the display device 12. In the augmented or virtual reality HMD device 10B example, the simulation 50 with the modified one or more physical parameters 40 may be presented via the near-eye display device 12B superimposed on the physical environment 36.

Figure 3:
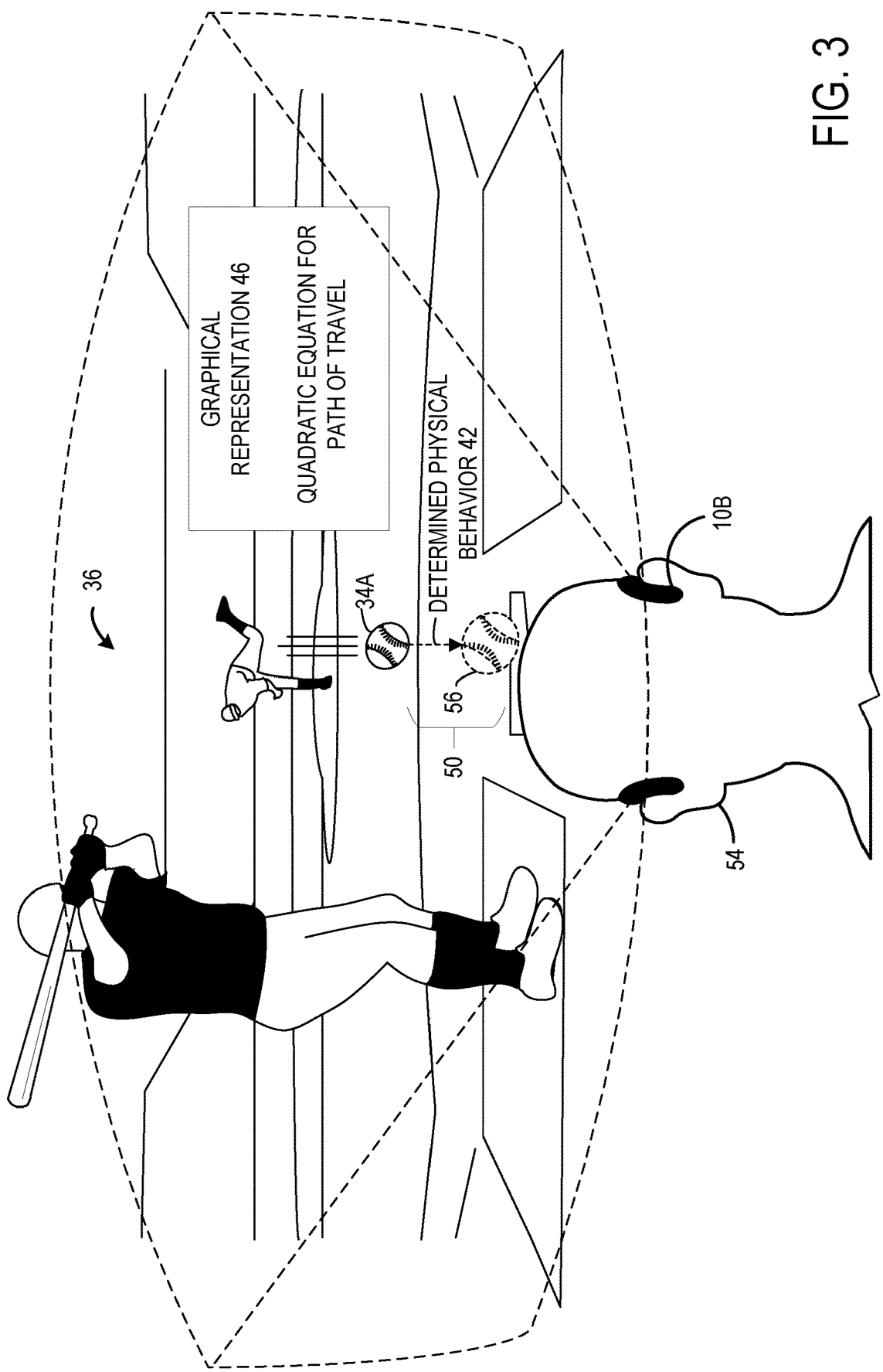
FIG. 3 shows an example simulation and graphical representation of a physical behavior of a physical object using the computer device of FIG. 1.

FIG. 3 illustrates an example graphical representation of a physical behavior of a thrown physical object and an example simulation of the physical behavior. In this example, a user 54 is wearing an augmented reality HMD device 10B and watching a baseball game occurring the physical environment 36. The user's HMD device 10B may have the physics trained model 30A downloaded, and thus the HMD device 10B may be processing the sensor data 26 received from the sensor devices 22 including the outward facing cameras 22E for physical objects 34 having physical behaviors 42 that are identifiable in the physics trained model 30A. In the illustrated example, the data analysis module 28 executed by the processor 18 of the HMD device 10B processes image data from the outward facing cameras 22E and detects a movable physical object 34A, which is a thrown baseball in this example, that is currently moving through the physical environment 36.

As discussed above, the data analysis module 28 may further measure one or more physical parameters 40 of the movable physical objected 34A, such as velocity, trajectory, position, gravitational force, etc. Based on the measured one or more physical parameters 40, the data analysis module 28 may determine a physical behavior 42 of the movable physical object 34A, which, in this specific example, is a predicted path of travel for the movable physical object 34A. It should be appreciated that the one or more physical parameters 40 and the physical behavior of the physical object 34 may be calculated in real-time. Thus, as the movable physical object 34A is still traveling, the HMD device 12B displays a graphical representation 46 of the physical behavior 42 to the user 54. In the illustrated example, the graphical representation 46 is a virtual object that shows the quadratic question for the movable physical object's path of travel including the one or more physical parameters 40 that are variables in the quadratic equation.

The simulation module 44 is configured to generate a simulation 50, which, in the illustrated example, includes a virtual movable object 56 that is rendered to have the appearance of the detected movable physical object 34A that is a baseball. The virtual movable object 56 is rendered to travel along the predicted path of travel physical behavior 42 that was determined for the detected movable physical object 34A. As shown, the simulation 50 may be presented to the user in real-time as the movable physical object 34A is still traveling.

As discussed above, the user 54 may enter user input to modify one or more measured physical parameters for the simulation 50. In one example, the user 54 may enter the user input via a gesture input detected via the outward facing cameras 22E. However, it should be appreciated that the user input may be entered through any suitable input modality, such as, for example, user input to a handheld input device, a voice input to a microphone sensor device 22B, etc. The user 54 may enter user input to modify any of the one or more physical parameters that were measured and used for the simulation 50 of the physical behavior 42 of the movable physical object 34A.

Figure 4:
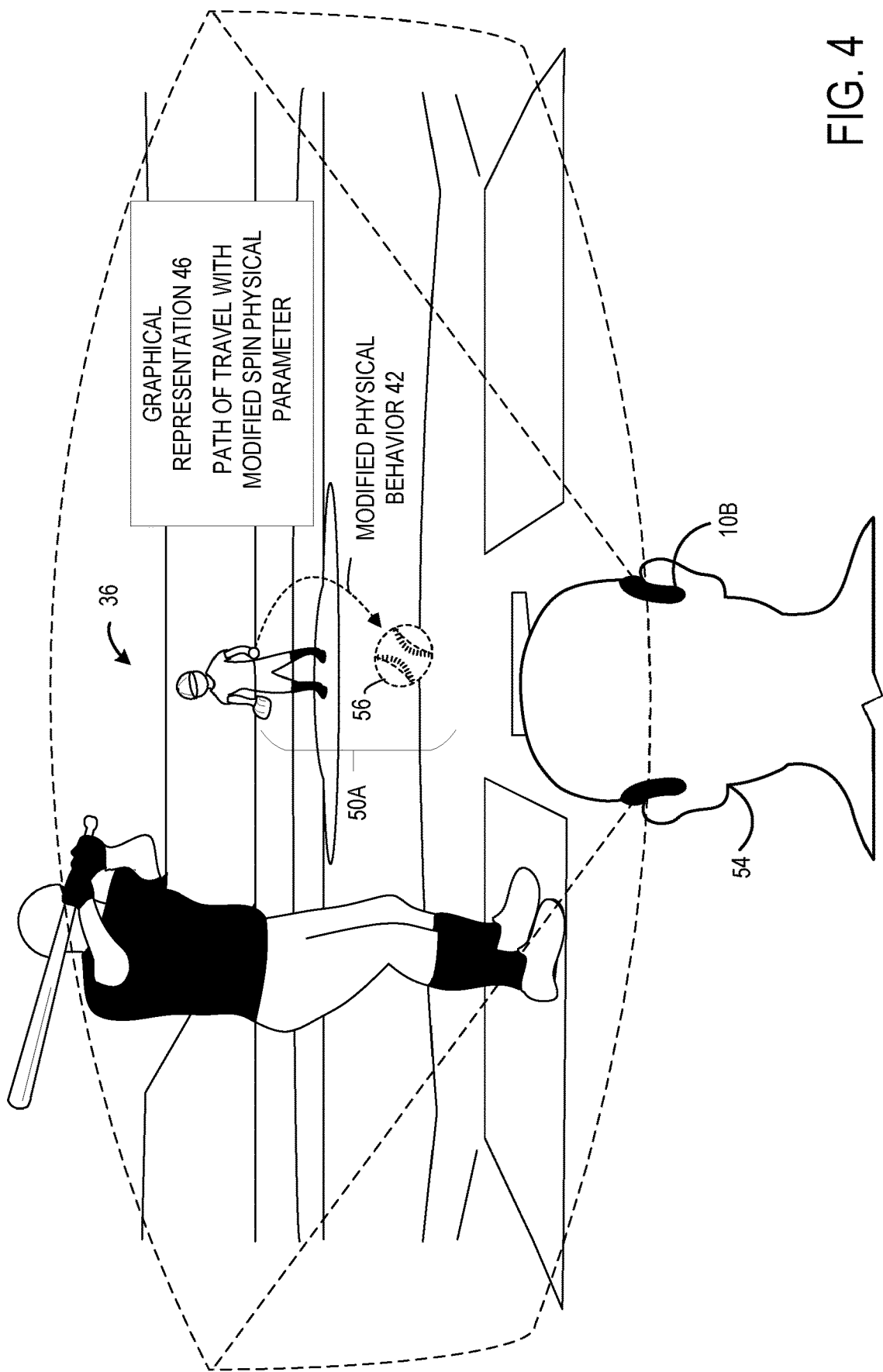
FIG. 4 shows a modification to physical parameters of the example simulation of FIG. 3.

FIG. 4 illustrates an example where the user 54 has entered a user input to modify a spin physical parameter of the movable physical object 34A. The data analysis module 28 may be configured to calculate a lift force that would be applied to the movable physical object 34A from the magnus effect based on the modified spin physical parameter, and calculate a modified physical behavior of a path of travel that the movable physical object 34A would travel along if the modified spin physical parameter has been applied in the real-world. The simulation module 44 may modify the simulation 50 based on the modified physical behavior 42 and the modified one or more physical parameters 40, and render a new modified simulation 50A. In the illustrated example, the modified simulation 50A includes a rendering of virtual movable object 56 traveling along a modified path of travel that accounts for an additional lift force due to the modified spin parameter entered by the user 54. As illustrated, the modified simulation 50A may be rendered as being location at specified positions and depths in the physical environment 36.

Figure 5:
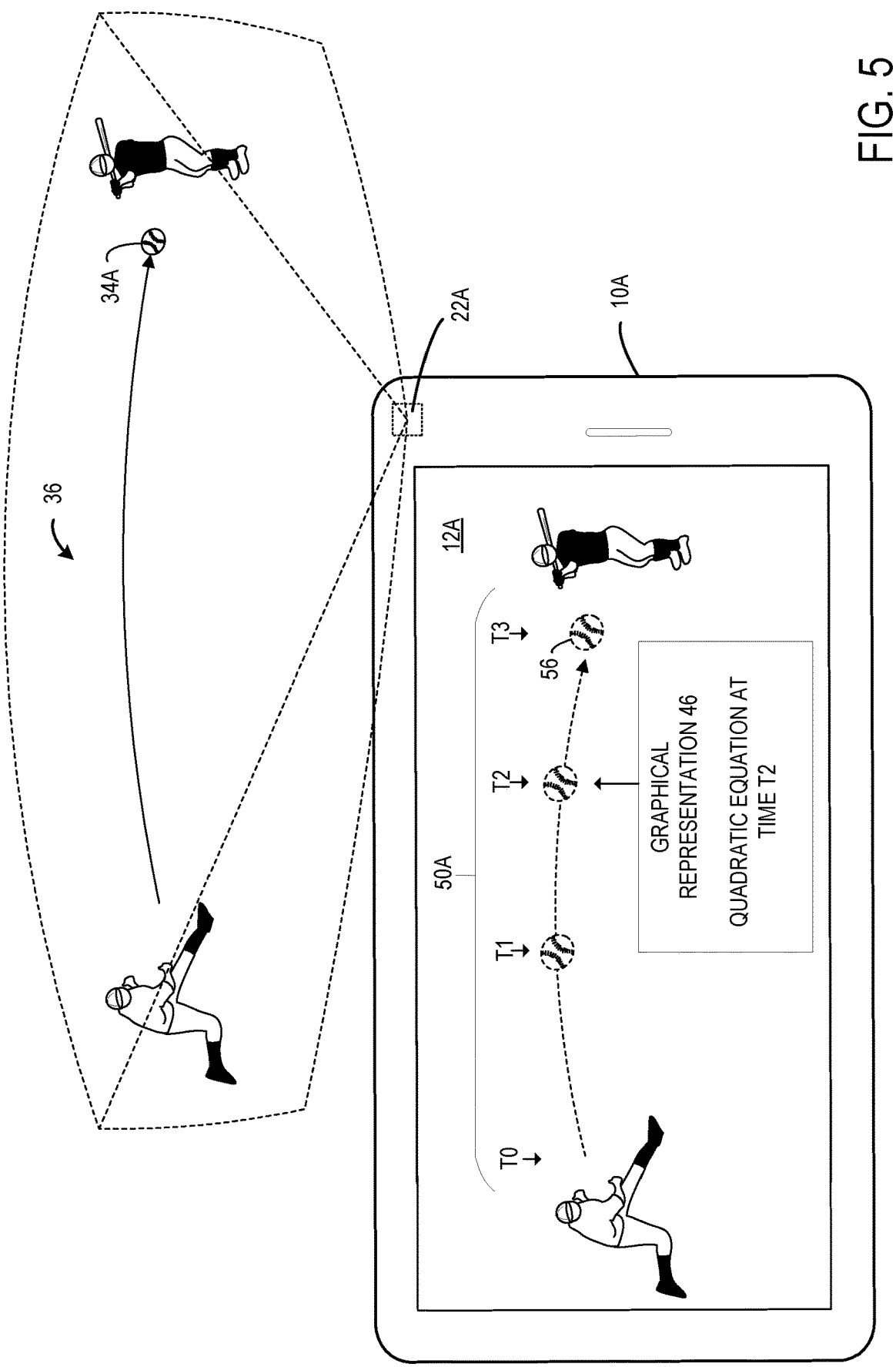
FIG. 5 shows another example simulation and graphical representation of a physical behavior of a physical object using the computer device of FIG. 1.

FIG. 5 illustrates a mobile computer device 10A example where the computer device 10 takes the form of a smart phone or tablet computer device. In this example, images of the physical environment 36 are captured by the camera 22A, and processed by the data analysis module 28 as described above. The simulation module 44 generates a simulation 50 of the path of travel physical behavior 42 of the movable physical object 34A. The simulation 50 is presented via the touch display 12A superimposed on the captured images of the physical environment 36. Additionally, a graphical representation 46 of the quadratic equation describing the path of travel of the movable physical object 34A is also presented via the touch display 12A. In this example, the user may enter input to the touch display 12A to change a time physical parameter 40. The simulation module 44 may modify the simulation 50A to display a virtual object 56 that represents the movable physical object 34A at different points in time selectable by the user by modifying the time physical parameter. The graphical representation 46 may present the values of each measured physical parameter 40 in the quadratic equation that describes the path of travel physical behavior at each point in time T0-T3.

Figure 6:
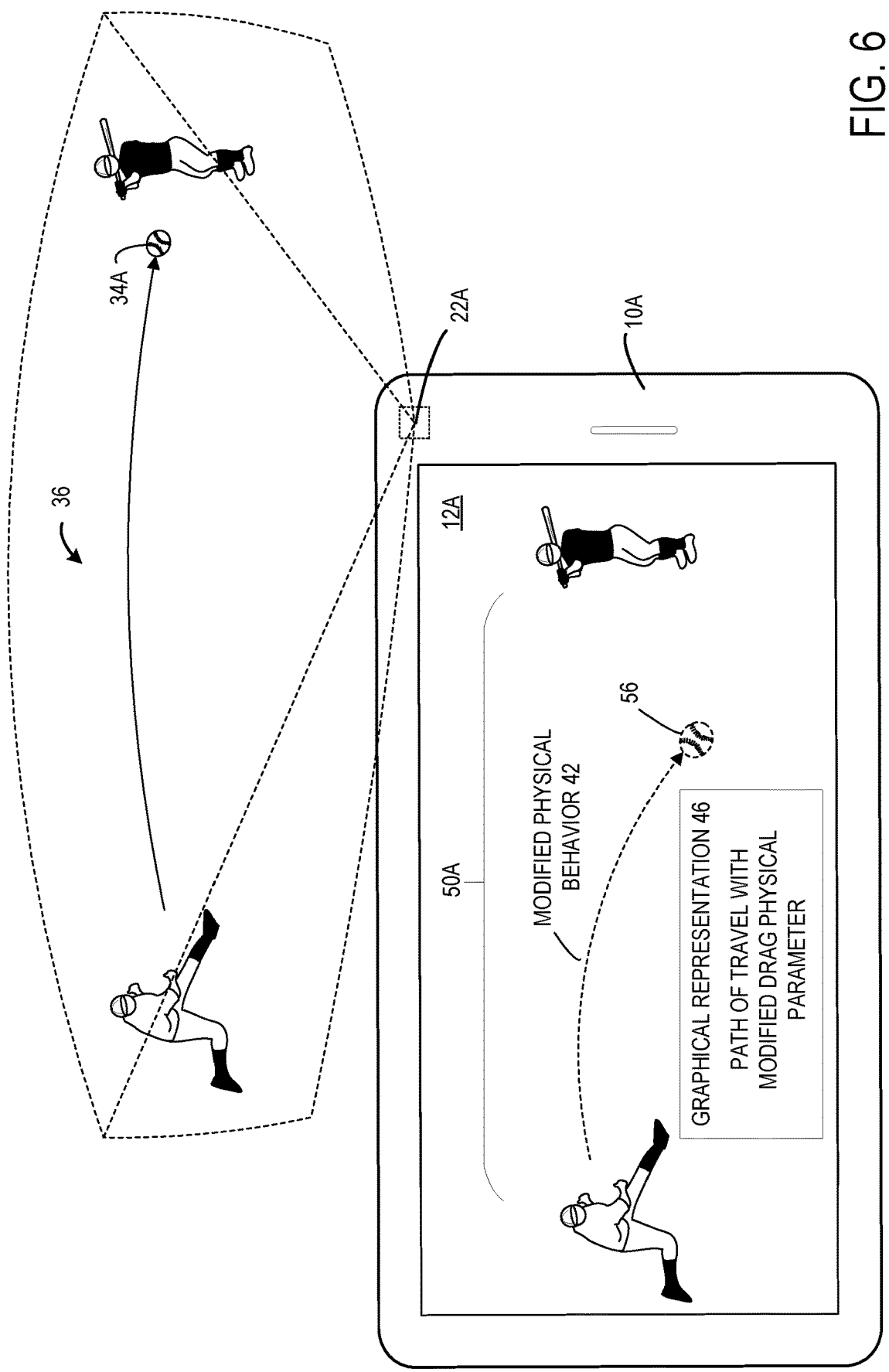
FIG. 6 shows a modification to physical parameters of the example simulation of FIG. 5.

FIG. 6 illustrates an example modified simulation 50A where the user has entered a user input to modify a drag physical parameter 40. For example, the user may have increased a wind speed of the physical environment 36 against the movable physical object 34A. The data analysis module 28 determines a modified physical behavior 42 for the physical object 34, which, in this example, is a modified path of travel that would cause the movable physical object 34A to decelerate more and travel a shorter distance with a lower arc than the movable physical object 34A did in the real world when it was captured by the sensor devices of the computer device 10. The modified simulation 50A and the graphical representation of the modified path of travel are presented to the user via the touch display 12A of the mobile computer device 10A.

Figure 7:
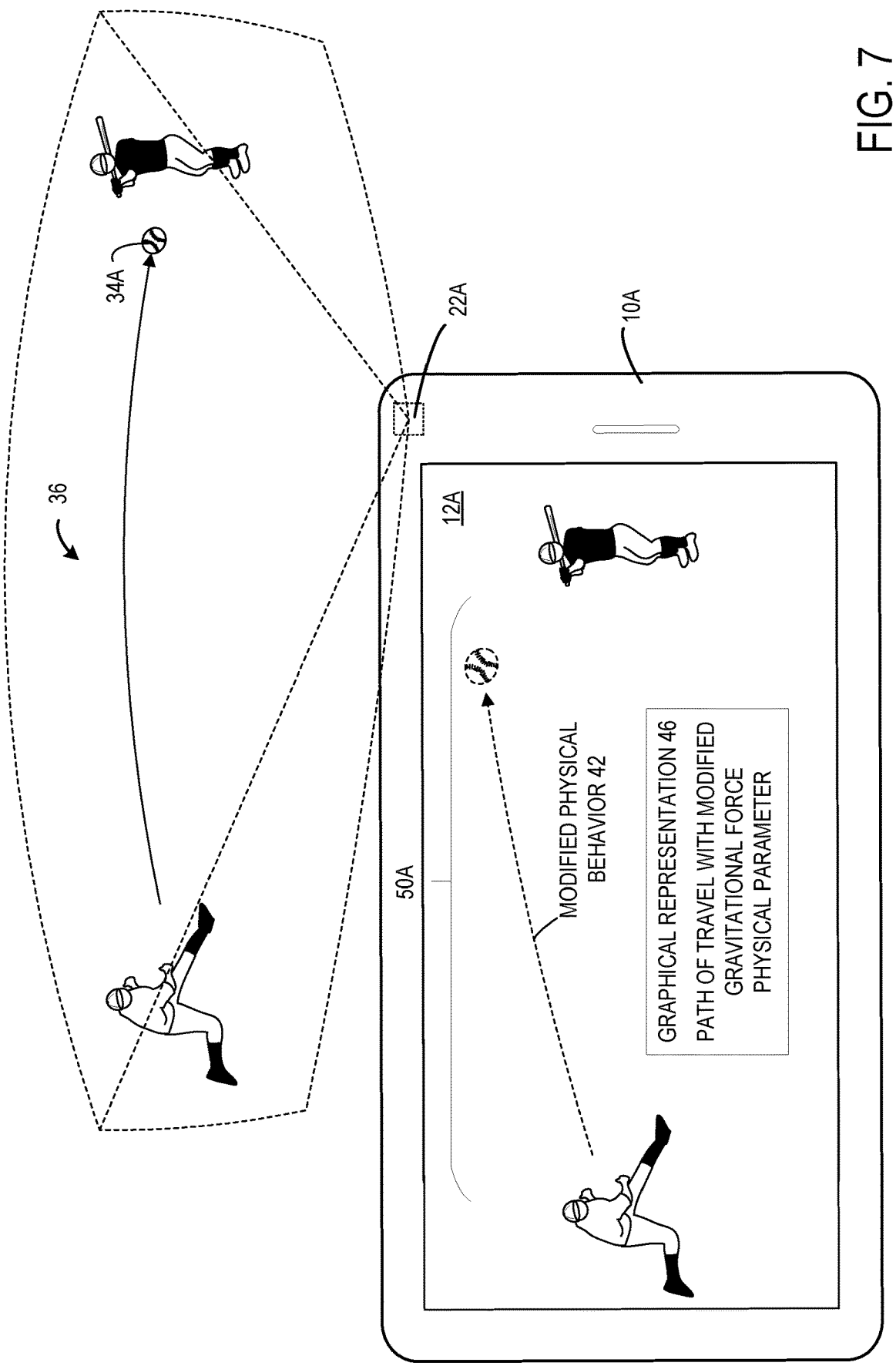
FIG. 7 shows another modification to physical parameters of the example simulation of FIG. 5.

FIG. 7 illustrates an example modified simulation 50A where the user has entered a user input to modify a gravitational force physical parameter 40. For example, the user may have changed the gravitational force physical parameter 40 of the physical environment 36 to a gravitational force of the moon. The data analysis module 28 determines a modified physical behavior 42 for the physical object 34, which, in this example, is a modified path of travel that would cause the movable physical object 34A to have a higher arc and travel further than the movable physical object 34A did in the real world when it was captured by the sensor devices of the computer device 10. The modified simulation 50A and the graphical representation of the modified path of travel are presented to the user via the touch display 12A of the mobile computer device 10A. It should be appreciated that the example modifications to physical parameters 40 illustrated in FIGS. 4-7 are merely exemplary, and that other suitable physical parameters 40 may also be modified by the user, and a corresponding modified simulation 50A may be generated and displayed to the user.

Figure 8:
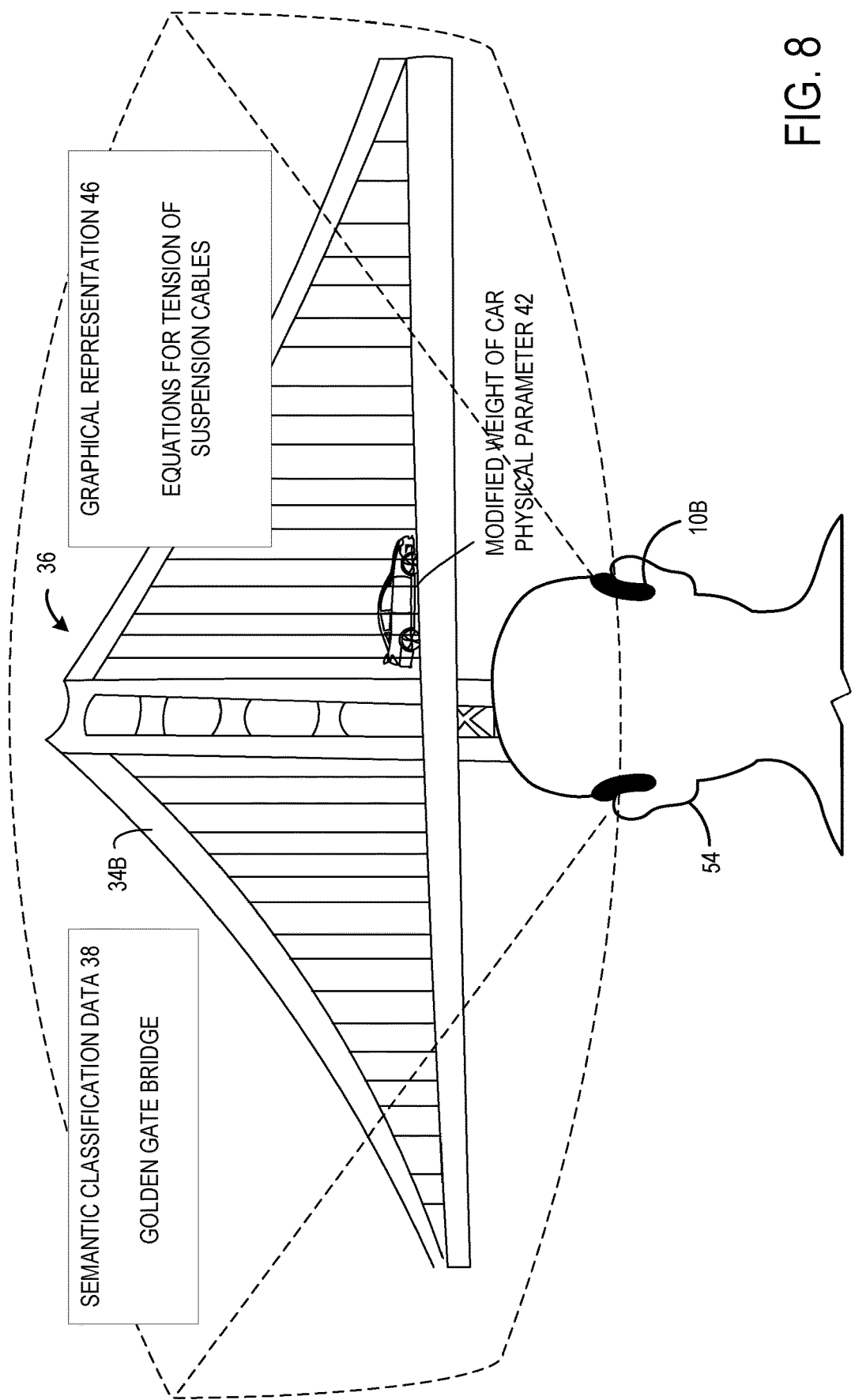
FIG. 8 shows an example simulation and graphical representation of a physical behavior of a physical object using the computer device of FIG. 1.

FIG. 8 illustrates an example where the physical object 34 is a structure physical object that is a bridge. The data analysis module 28 may be configured to process the images captured by the outward facing cameras 22E of the HMD device 10B and detect the physical object 34B. Based on bridge and structure trained model data, the data analysis module 28 may detect the bridge physical object 34B in the captured images. Further, the data analysis module 28 may identify the bridge physical object 34B as the Golden Gate Bridge based on the trained model data, and retrieve associated semantic classification data for the Golden Gate Bridge. The HMD device 10B may be configured to present the semantic classification data 38 via the display device 12. In the illustrated example, the Golden Gate Bridge semantic classification data 38 is presented to the user superimposed on the physical environment 36.

The data analysis module 28 may be configured to measure one or more physical parameters 40 of the bridge physical object 34B. In one example, the measured physical parameters 40 include a load placed on the bridge by cars. As discussed previously, the load may be estimated based on identifying car physical objects in the images captured by the camera sensor devices 22A, and retrieving estimated weights for the identified car physical objects. The data analysis module 28 may calculate a physical behavior 42 of the bridge physical object 34A based on measured one or more physical parameters 40. In the illustrated example, the physical behavior 42 may include equations for the tension on each suspension cable of the bridge physical object 34B as the load on the bridge changes from traveling cars.

The user 54 may enter input to modify the one or more physical parameters 40 for a simulation 50, such as, for example, changing a weight of a car physical object on the bridge to modify the load being placed on the bridge physical object 34B. The effect of the modified load physical parameter 40 on the equations for tension of the suspension cables may be presented to the user 54 via the display 12 in a modified simulation.

It should be appreciated that other types of physical behaviors and physical parameters may be measured and modified in the example illustrated in FIG. 8. For example, the one or more physical parameters may include wind speeds or forces applied to the bridge physical object 34B by an earthquake, and the physical behavior 42 may be a vibration or oscillation of the bridge physical object 34B while being subjected to those forces.

Figure 9:
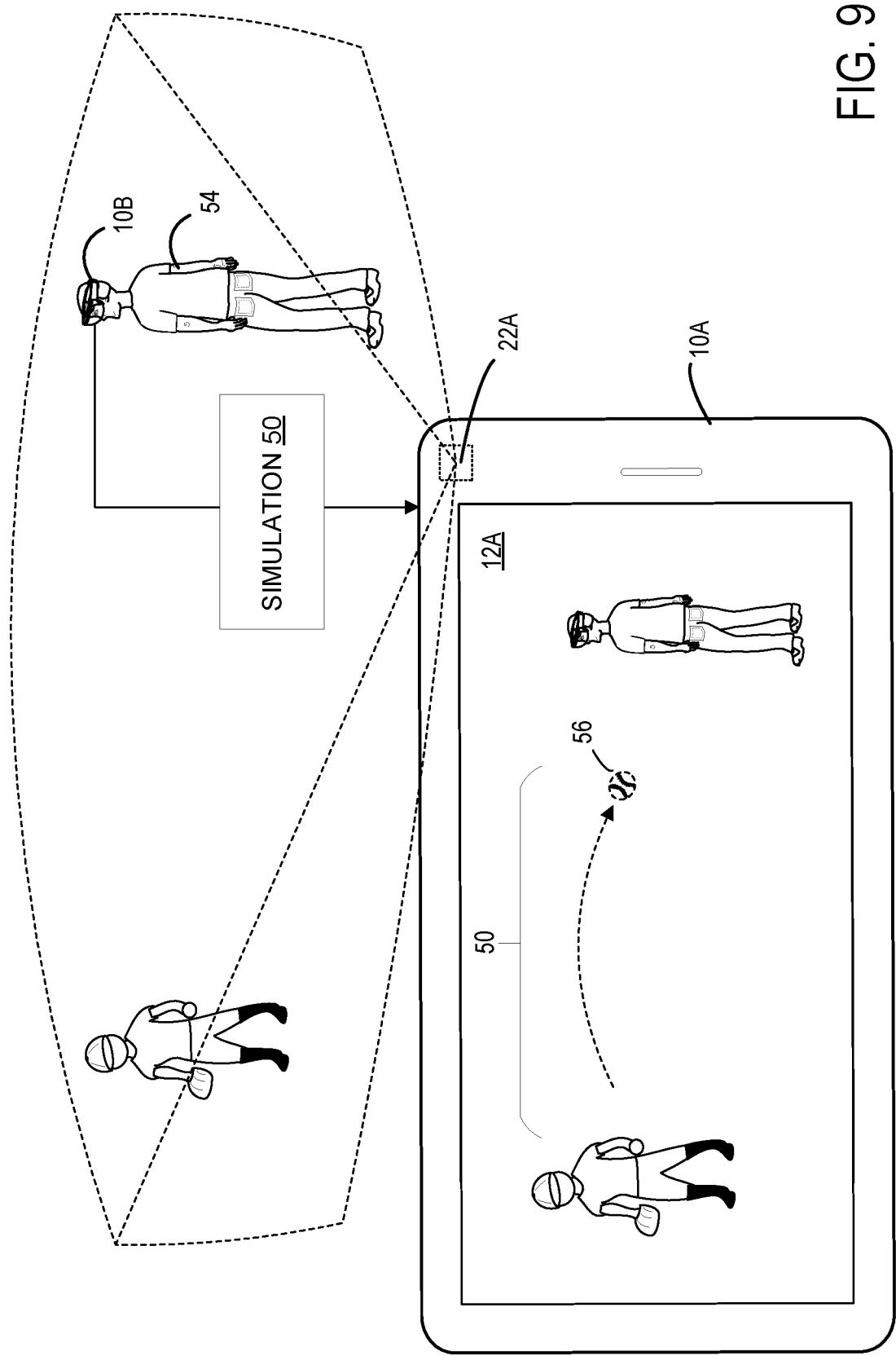
FIG. 9 shows a simulation being shared between two of the computer devices of FIG. 1.

Turning to FIG. 9, in one example, the computer device 10 may be configured to share the simulation 50 with other computer devices. In the illustrated example, the user 54 is wearing the HMD device 10B, and has already captured images of a movable physical object 34A as described with reference to FIG. 3. The user 54's HMD device 10B has generated a simulation 50 based on the measured physical parameters 40 and the determined physical behavior 42 of the movable physical object 34A. As described previously, the user 54 may modify the simulation 50 by entering user input to modify the one or more physical parameters 40. Further, the user 54 may enter an input to the GUI 48 to share the simulation 50 with another user.

In this example, the user 54's HMD device 10B is configured to send the simulation 50 to one or more other computer devices to cause the one or more computer devices to display the simulation 50 from a perspective of the one or more other computer devices. In the illustrated example, the HMD device 10B sends data for the simulation 50 to the mobile computer device 10A of a different user. The simulation 50 may include surface reconstruction and localization data, such that the mobile computer device 10A may appropriately world-lock the virtual object 56 of the simulation 50 to the positions specified by the HMD device 10B. Additionally, the renderings of the simulation 50 may be superimposed on images captured by the camera 22A of the mobile computer device such that the virtual object 56 of the simulation 50 is rendered from the perspective of the mobile computer device 10A. It should be appreciated that while the illustrated example shows the HMD device 10B sharing the simulation 50 with a single mobile computer device 10A, that the HMD device 10B may share the simulation with a plurality of other computer devices taking other forms, such as, for example, other HMD devices. Further, in some examples, the mobile computer device 10A may generate and send the simulation 50 to the HMD device 10B, or another computer device 10.

Figure 10:
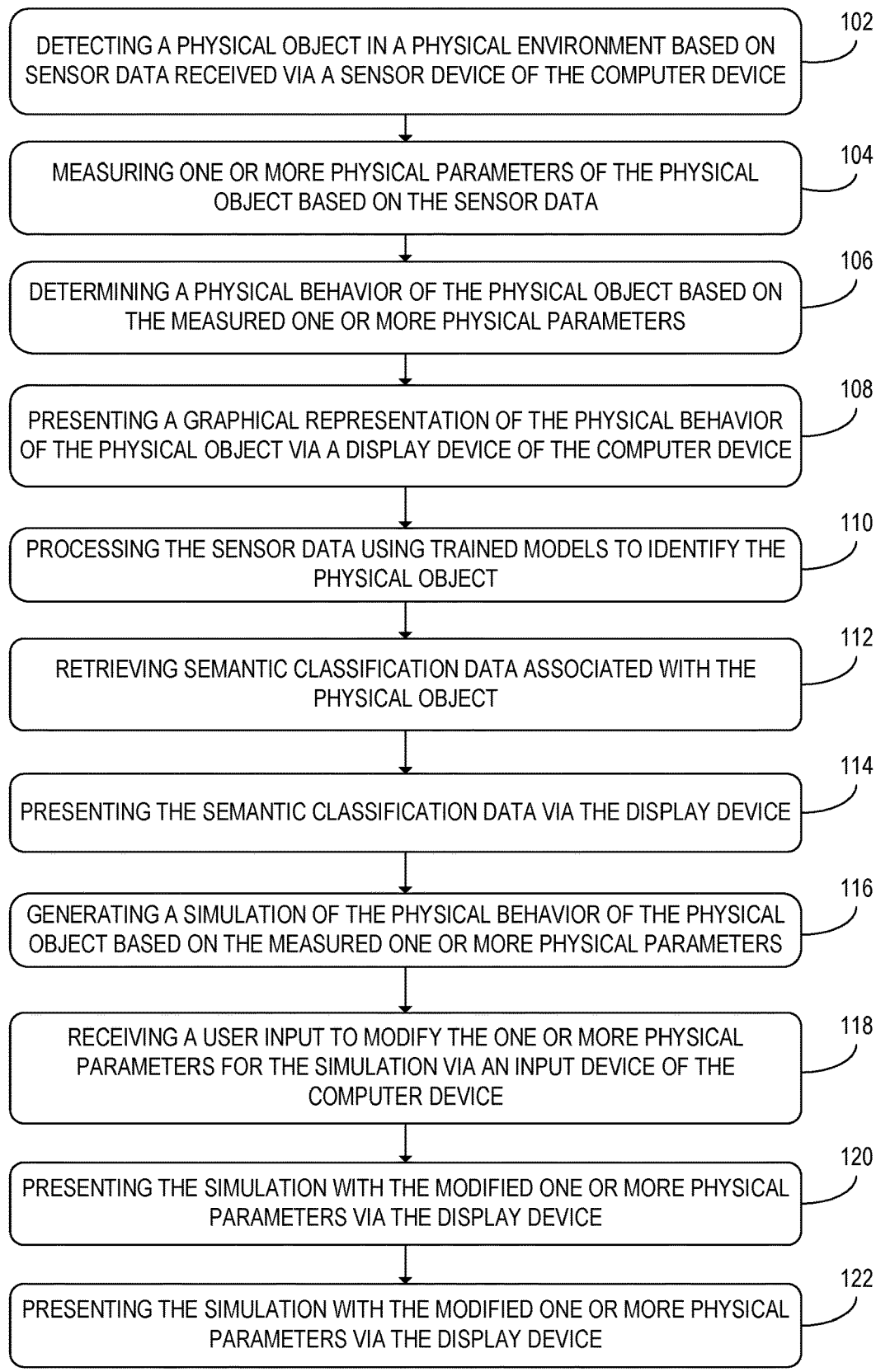
FIG. 10 shows a flowchart for a computer-implemented method for simulation of physical behaviors of physical objects implemented by the computer device of FIG. 1.

FIG. 10 shows a flowchart of a computer-implemented method 100. The method 100 may be implemented by the computer device 10 of FIG. 1. At 102, the method 100 may include detecting a physical object in a physical environment based on sensor data received via a sensor device of the computer device. For example, the computer device implementing the method 100 may include a camera sensor device as illustrated in FIG. 1. Images captured images by the camera sensor devices may be processed with surface reconstruction, edge detection, centroid detection, and other machine vision processing methods to detect one or more physical objects. The types of physical objects detected at step 102 may include structures, movable objects, natural objects, and other types of objects. As a few non-limiting examples, structure objects may include buildings, bridges, and other structures mounted immovably to the physical environment 36. The movable objects may include man-made objects that are movable, such as a rock, a ball, a car, etc. Natural objects may include animals, birds, plants, people, rocks, mountains, clouds, etc.

At 104, the method 100 may include measuring one or more physical parameters of the physical object based on the sensor data. The physical parameters may be measured based on sensor data received from a plurality of different sensor devices of the computer device implementing the method 100, such as, for example, the computer device 10 of FIG. 1. For example, velocity, position, heading, and volume parameters may be calculated based on a series of images captured by camera sensor devices 22A and depth sensor devices 22C. Other methods and processes for measuring physical parameters based on sensor data received via sensor devices are described above with reference to FIG. 1.

At 106, the method 100 may include determining a physical behavior of the physical object based on the measured one or more physical parameters. An example physical behavior 42 may include a path of travel of a movable object that may be determined based on measured physical parameters 40 such as an initial velocity, trajectory, gravitational force, wind speed, drag, etc. Other types of physical behaviors 42 described above may include deformation, vibration, oscillation, and shear. It should be appreciated that other types of physical behaviors may be determined based on other types of physical parameters not specifically described herein.

At 108, the method 100 may include presenting a graphical representation of the physical behavior of the physical object via a display device of the computer device. In one example, the graphical representation may be rendered in a graphical user interface layer that is rendered on top of images of the physical environment captured by the camera sensor devices of the computer device. FIG. 3 illustrates an example where the graphical representation is generated as a virtual object having a location in the physical environment and rendered as a hologram that is superimposed on the physical environment. An augmented reality HMD device includes an at least partially see-through display 12B, and the graphical representation is rendered from the user's current perspective determined based on the sensor devices of the HMD device including the user's detected gaze direction, pose, location, and position relative to surfaces identified in the physical environment. Other rendering methods may be utilized for other types of displays, such as non-see-through displays.

At 110, the method 100 may include processing the sensor data using trained models to identify the physical object. In the example illustrated in FIG. 1, the computer device may utilize trained model data 30 that may be retrieved from a server system 32 and/or memory of the computer device 10. The trained model data 30 may include one or more different types of trained models such as a physical model 30A, a natural object model 30B, etc. As a few other non-limiting examples, the trained model data 30 may include a chemistry model, a dynamic physics model, a static physics model, a geology model, a meteorology model, etc. Each of the trained models 30 may be downloaded separately by a user of the computer device 10 to selectively choose a learning focus for the computer device 10.

At 112, the method 100 may include retrieving semantic classification data associated with the physical object. In one example illustrated described with reference to FIG. 1, the computer device may be configured to detect a flying object in the images captured by the sensor devices 22 based on natural object trained model data, and further identify that the flying object is an eagle based on features such as beak shape, wing shape, size, etc., used to train the natural object model 30B. After identification, the physical object 34 may be tagged with semantic classification data 38 of an eagle. It should be appreciated that identifiable physical objects 34 are not limited to animals, but may further include building and bridge classifications such as a specific historical building or bridge, a specific architectural design, etc. As another example, identifiable physical objects 34 may further include geology classifications, such as a type or composition of rocks and minerals.

At 114, the method 100 may include presenting the semantic classification data via the display device. Similarly to step 108, the semantic classification data may be rendered in a GUI layer on top of captured images of the physical environment, or as a virtual object having a virtual position in a 3D mapping of the physical environment and rendered based on the user's perspective. In another example, the semantic classification data may be output to the user via other output methods, such as, for example, via a speaker output device.

At 116, the method 100 may include generating a simulation of the physical behavior of the physical object based on the measured one or more physical parameters. In the example described with reference to FIGS. 3 and 4, the computer device may generate a virtual object or hologram with the appearance of the physical object detected at step 102. Rendering the simulation may include rendering the virtual object or hologram of the physical object to follow the determined physical behavior 42, such as, for example, a virtual ball following a determined path of travel. The simulation may simulate all of the physical parameters that were measured for the physical object at step 104 in real-time.

At 118, the method 100 may include receiving a user input to modify the one or more physical parameters for the simulation via an input device of the computer device. The user input may be received via any suitable input modality. Mobile computer device 10A examples of the computer device may be configured to receive the user input via touch input to a touch screen. HMD device 10B examples of the computer device may be configured to receive the user input via gestures detected based on forward facing cameras and depth sensors. The user may modify any of the physical parameters 40 measured at step 104. The computer device is configured to modify the simulation to account for the modified physical parameters 40. At 120, the method 100 may include presenting the simulation with the modified one or more physical parameters via the display device. The simulation may be presented via the same rendering methods and display methods described above at steps 108 and 114.

At 122, the method 100 may include sending the simulation to one or more other computer devices to cause the one or more computer devices to display the simulation from a perspective of the one or more other computer devices. FIG. 9 illustrates an example simulation sharing between an HMD device 10B and a mobile computer device 10A. The simulation shared by the HMD device 10B may include surface reconstruction and localization data, such that the mobile computer device 10A may appropriately world-lock the virtual object 56 of the simulation 50 to the positions specified by the HMD device 10B. Additionally, the renderings of the simulation 50 may be superimposed on images captured by the camera 22A of the mobile computer device such that the virtual object 56 of the simulation 50 is rendered from the perspective of the mobile computer device 10A.

In some embodiments, the methods and processes described herein may be tied to a computing system of one or more computing devices. In particular, such methods and processes may be implemented as a computer-application program or service, an application-programming interface (API), a library, and/or other computer-program product.

Figure 11:
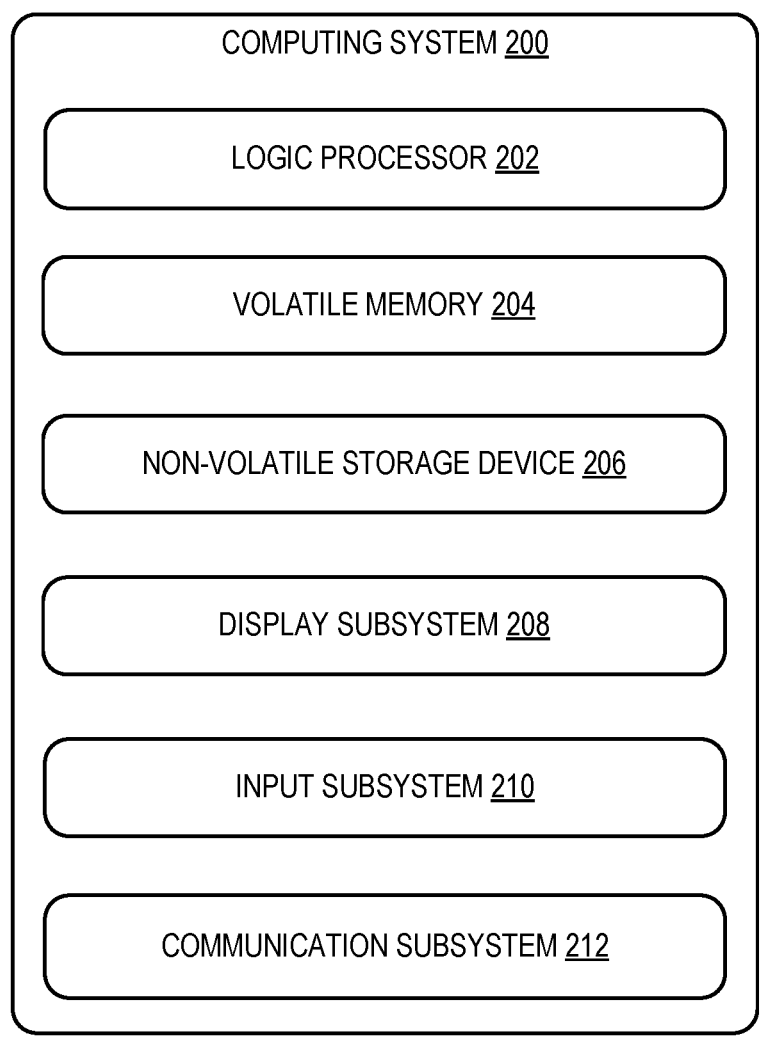
FIG. 11 shows a schematic representation of an example computing system, according to one embodiment of the present disclosure.

FIG. 11 schematically shows a non-limiting embodiment of a computing system 200 that can enact one or more of the methods and processes described above. Computing system 200 is shown in simplified form. Computing system 200 may, for example, embody the computer device 10 of FIG. 1, or may instead embody some other computing system. Computing system 200 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented/virtual reality devices.

Computing system 200 includes a logic processor 202, volatile memory 204, and a non-volatile storage device 206. Computing system 200 may optionally include a display subsystem 208, input subsystem 210, communication subsystem 212, and/or other components not shown in FIG. 11.

Logic processor 202 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor 202 may include one or more physical processors (hardware) configured to execute software instructions. Additionally or alternatively, the logic processor 202 may include one or more hardware logic circuits or firmware devices configured to execute hardware-implemented logic or firmware instructions. Processors of the logic processor 202 may be single-core or multi-core, and the instructions executed thereon may be configured for sequential, parallel, and/or distributed processing. Individual components of the logic processor 202 optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects may be run on different physical logic processors of various different machines.

Volatile memory 204 may include physical devices that include random access memory. Volatile memory 204 is typically utilized by logic processor 202 to temporarily store information during processing of software instructions. It will be appreciated that volatile memory 204 typically does not continue to store instructions when power is cut to the volatile memory 204.

Non-volatile storage device 206 includes one or more physical devices configured to hold instructions executable by the logic processors to implement the methods and processes described herein. When such methods and processes are implemented, the state of non-volatile storage device 206 may be transformed—e.g., to hold different data.

Non-volatile storage device 206 may include physical devices that are removable and/or built-in. Non-volatile storage device 206 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 206 may include nonvolatile, dynamic, static, read/write, read-only, sequential-access, location-addressable, file-addressable, and/or content-addressable devices. It will be appreciated that non-volatile storage device 206 is configured to hold instructions even when power is cut to the non-volatile storage device 206.

Aspects of logic processor 202, volatile memory 204, and non-volatile storage device 206 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The term "program" may be used to describe an aspect of computing system 200 implemented to perform a particular function. In some cases, a program may be instantiated via logic processor 202 executing instructions held by non-volatile storage device 206, using portions of volatile memory 204. It will be understood that different programs may be instantiated from the same application, service, code block, object, library, routine, API, function, etc. Likewise, the same program may be instantiated by different applications, services, code blocks, objects, routines, APIs, functions, etc. The term "program" encompasses individual or groups of executable files, data files, libraries, drivers, scripts, database records, etc.

When included, display subsystem 208 may be used to present a visual representation of data held by non-volatile storage device 206. As the herein described methods and processes change the data held by the non-volatile storage device 206, and thus transform the state of the non-volatile storage device 206, the state of display subsystem 208 may likewise be transformed to visually represent changes in the underlying data. Display subsystem 208 may include one or more display devices utilizing virtually any type of technology. Such display devices may be combined with logic processor 202, volatile memory 204, and/or non-volatile storage device 206 in a shared enclosure, or such display devices may be peripheral display devices.

When included, input subsystem 210 may comprise or interface with one or more user-input devices such as a keyboard, mouse, touch screen, or game controller. In some embodiments, the input subsystem 210 may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection, gaze detection, and/or intent recognition; as well as electric-field sensing componentry for assessing brain activity; and/or any other suitable sensor.

When included, communication subsystem 212 may be configured to communicatively couple computing system 200 with one or more other computing devices. Communication subsystem 212 may include wired and/or wireless communication devices compatible with one or more different communication protocols. As non-limiting examples, the communication subsystem 212 may be configured for communication via a wireless telephone network, or a wired or wireless local- or wide-area network. In some embodiments, the communication subsystem 212 may allow computing system 200 to send and/or receive messages to and/or from other devices via a network such as the Internet.

The following paragraphs provide additional support for the claims of the subject application. One aspect provides a computer device comprising an input device, a sensor device, a display device, and a processor. The processor is configured to detect a physical object in a physical environment based on sensor data received via the sensor device, measure one or more physical parameters of the physical object based on the sensor data, determine a physical behavior of the physical object based on the measured one or more physical parameters, present a graphical representation of the physical behavior of the physical object via the display device, generate a simulation of the physical behavior of the physical object based on the measured one or more physical parameters, receive a user input to modify the one or more physical parameters for the simulation via the input device, and present the simulation with the modified one or more physical parameters via the display device. In this aspect, additionally or alternatively, the physical object may be selected from the group consisting of a structure, a movable object, and a natural object. In this aspect, additionally or alternatively, the one or more physical parameters may be selected from the group consisting of velocity, position, heading, mass, volume, gravitational force, wind speed, drag, shear force, friction, and load. In this aspect, additionally or alternatively, the physical behavior of the physical object may be selected from the group consisting of a path of travel, deformation, vibration, oscillation, and shear. In this aspect, additionally or alternatively, the processor may be further configured to present the graphical representation of the physical behavior of the physical object superimposed on the physical environment. In this aspect, additionally or alternatively, the computer device may be a head mounted display device, and wherein the display may be a near-eye display device. In this aspect, additionally or alternatively, the near-eye display device may be at least partially see-through, and the processor may be further configured to present the simulation with the modified one or more physical parameters via the near-eye display device superimposed on the physical environment. In this aspect, additionally or alternatively, the processor may be further configured to process the sensor data using trained models to identify the physical object, retrieve semantic classification data associated with the physical object, and present the semantic classification data via the display device. In this aspect, additionally or alternatively, the processor may be further configured to send the simulation to one or more other computer devices to cause the one or more computer devices to display the simulation from a perspective of the one or more other computer devices.

Another aspect provides a method comprising, at a computer device including a processor, detecting a physical object in a physical environment based on sensor data received via a sensor device of the computer device, measuring one or more physical parameters of the physical object based on the sensor data, determining a physical behavior of the physical object based on the measured one or more physical parameters, presenting a graphical representation of the physical behavior of the physical object via a display device of the computer device, generating a simulation of the physical behavior of the physical object based on the measured one or more physical parameters, receiving a user input to modify the one or more physical parameters for the simulation via an input device of the computer device, and presenting the simulation with the modified one or more physical parameters via the display device. In this aspect, additionally or alternatively, the physical object may be selected from the group consisting of a structure, a movable object, and a natural object. In this aspect, additionally or alternatively, the one or more physical parameters may be selected from the group consisting of velocity, position, heading, mass, volume, gravitational force, wind speed, drag, shear force, friction, and load. In this aspect, additionally or alternatively, the physical behavior of the physical object may be selected from the group consisting of a path of travel, deformation, vibration, oscillation, and shear. In this aspect, additionally or alternatively, the method may further comprise presenting the graphical representation of the physical behavior of the physical object superimposed on the physical environment. In this aspect, additionally or alternatively, the computer device may be a head mounted display device, and wherein the display device may be a near-eye display device. In this aspect, additionally or alternatively, the near-eye display device may be at least partially see-through, and the method may further comprise presenting the simulation with the modified one or more physical parameters via the near-eye display device superimposed on the physical environment. In this aspect, additionally or alternatively, the method may further comprise processing the sensor data using trained models to identify the physical object, retrieving semantic classification data associated with the physical object, and presenting the semantic classification data via the display device. In this aspect, additionally or alternatively, the method may further comprise sending the simulation to one or more other computer devices to cause the one or more computer devices to display the simulation from a perspective of the one or more other computer devices.

Another aspect provides a head mounted display device comprising an input device, a sensor device, a near-eye display device, and a processor. The processor is configured to detect a physical object in a physical environment based on sensor data received via the sensor device, measure one or more physical parameters of the physical object based on the sensor data, determine a physical behavior of the physical object based on the measured one or more physical parameters, generate a simulation of the physical behavior of the physical object based on the measured one or more physical parameters, receive a user input to modify the one or more physical parameters for the simulation via the input device, and present the simulation with the modified one or more physical parameters via the near-eye display device. In this aspect, additionally or alternatively, the simulation displayed via the near-eye display may be superimposed on the physical environment.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computer device comprising:
an input device, a sensor device, a display device, and a processor configured to:
detect a physical object in a physical environment based on sensor data received via the sensor device;
process the sensor data using trained models to identify the physical object and determine an object type for the physical object;
based at least on the object type of the physical object identified using the trained models, determine one or more physical parameters and a physical behavior associated with the one or more physical parameters to be modeled for the physical object;

measure the one or more physical parameters of the physical object based on the sensor data;

model the physical behavior of the physical object based on the object type of the physical object and the measured one or more physical parameters;

present a graphical representation of the physical behavior of the physical object via the display device;

generate a simulation of the physical behavior of the physical object based on the object type of the physical object and the measured one or more physical parameters;

receive a user input to modify the one or more physical parameters for the simulation via the input device;

determine a modified physical behavior based on the user input and the object type of the physical object;

modify the simulation of the physical behavior of the physical object based on the determined modified physical behavior; and present the simulation with the modified one or more physical parameters via the display device.

2. The computer device of claim 1, wherein the object type of the physical object is selected from the group consisting of a structure, a movable object, and a natural object.

3. The computer device of claim 1, wherein the one or more physical parameters are selected from the group consisting of velocity, position, heading, mass, volume, gravitational force, wind speed, drag, shear force, friction, and load.

4. The computer device of claim 1, wherein the physical behavior of the physical object is selected from the group consisting of a path of travel, deformation, vibration, oscillation, and shear.

5. The computer device of claim 1, wherein the processor is further configured to present the graphical representation of the physical behavior of the physical object superimposed on the physical environment.

6. The computer device of claim 1, wherein the computer device is a head mounted display device, and wherein the display device is a near-eye display device.

7. The computer device of claim 6, wherein the near-eye display device is at least partially see-through, and the processor is further configured to present the simulation with the modified one or more physical parameters via the near-eye display device superimposed on the physical environment.

8. The computer device of claim 1, wherein the processor is further configured to:

retrieve semantic classification data associated with the physical object; and present the semantic classification data via the display device.

9. The computer device of claim 1, wherein the processor is further configured to send the simulation to one or more other computer devices to cause the one or more computer devices to display the simulation from a perspective of the one or more other computer devices.

10. A method comprising:

at a computer device including a processor:

detecting a physical object in a physical environment based on sensor data received via a sensor device of the computer device;

processing the sensor data using trained models to identify the physical object and determine an object type for the physical object;

based at least on the object type of the physical object identified using the trained models, determining one or more physical parameters and a physical behavior associated with the one or more physical parameters to be modeled for the physical object;

measuring the one or more physical parameters of the physical object based on the sensor data;

modeling the physical behavior of the physical object based on the object type of the physical object and the measured one or more physical parameters;

presenting a graphical representation of the physical behavior of the physical object via a display device of the computer device;

generating a simulation of the physical behavior of the physical object based on the object type of the physical object and the measured one or more physical parameters;

receiving a user input to modify the one or more physical parameters for the simulation via an input device of the computer device;

determining a modified physical behavior based on the user input and the object type of the physical object;

modifying the simulation of the physical behavior of the physical object based on the determined modified physical behavior; and presenting the simulation with the modified one or more physical parameters via the display device.

11. The method of claim 10, wherein the object type of the physical object is selected from the group consisting of a structure, a movable object, and a natural object.

12. The method of claim 10, wherein the one or more physical parameters are selected from the group consisting of velocity, position, heading, mass, volume, gravitational force, wind speed, drag, shear force, friction, and load.

13. The method of claim 10, wherein the physical behavior of the physical object is selected from the group consisting of a path of travel, deformation, vibration, oscillation, and shear.

14. The method of claim 10, wherein the method further comprises presenting the graphical representation of the physical behavior of the physical object superimposed on the physical environment.

15. The method of claim 10, wherein the computer device is a head mounted display device, and wherein the display device is a near-eye display device.

16. The method of claim 15, wherein the near-eye display device is at least partially see-through, and the method further comprises presenting the simulation with the modified one or more physical parameters via the near-eye display device superimposed on the physical environment.

17. The method of claim 10, wherein the method further comprises:

retrieving semantic classification data associated with the physical object; and presenting the semantic classification data via the display device.

18. The method of claim 10, wherein the method further comprises sending the simulation to one or more other computer devices to cause the one or more computer devices to display the simulation from a perspective of the one or more other computer devices.

19. A head mounted display device comprising:
an input device, a sensor device, a near-eye display device, and a processor configured to:
  detect a physical object in a physical environment based on sensor data received via the sensor device;
  process the sensor data using trained models to identify the physical object and determine an object type for the physical object;
  based at least on the object type of the physical object identified using the trained models, determine one or more physical parameters and a physical behavior associated with the one or more physical parameters to be modeled for the physical object;
  measure the one or more physical parameters of the physical object based on the sensor data;
  model the physical behavior of the physical object based on the object type of the physical object and the measured one or more physical parameters;
  generate a simulation of the physical behavior of the physical object based on the object type of the physical object and the measured one or more physical parameters;
  receive a user input to modify the one or more physical parameters for the simulation via the input device;
  determine a modified physical behavior based on the user input and the object type of the physical object;
  modify the simulation of the physical behavior of the physical object based on the determined modified physical behavior; and
  present the simulation with the modified one or more physical parameters via the near-eye display device.

20. The head mounted display device of claim 19, wherein the simulation displayed via the near-eye display is superimposed on the physical environment.

\* \* \* \* \*